United States Patent Office

3,660,278
Patented May 2, 1972

3,660,278
PROCESS FOR PREPARING SPECIALLY
ACTIVATED SLUDGE
Akio Mimura, Tokyo, Takatsugu Kawano, Saitama, and Kanshi Yamaga, Tokyo, Japan, assignors to Asahi Kasei Kogyo Kabushiki Kaisha
No Drawing. Filed Apr. 15, 1969, Ser. No. 816,412
Claims priority, application Japan, Apr. 27, 1968, 43/27,978
Int. Cl. C02c 1/06
U.S. Cl. 210—11
8 Claims

ABSTRACT OF THE DISCLOSURE

A process for preparing a specially activated sludge capable of being utilized in the biological treatment of waste waters containing poisonous substances, which comprises culturing in liquid media the screened microorganisms having properties of decomposing said poisonous substances contained in the chemical industry waste waters or in sewage waste waters, blending said cultured liquid of the microorganisms with an aqueous suspension of the usual activated sludge used in the treatment of the waste waters discharged from the food industries, fermentation industries, paper manufacturing industries, leather industries, etc. or in that of sewage or human excrements, and flowing continuously the aqueous solution containing said poisonous substances into the resulting blended liquid under aerobic conditions to force said microorganisms to combine with said usual activated sludge in commensal state.

---

The present invention relates to a process for preparing activated sludge and more particularly to a process for preparing a specially activated sludge which comprises forcing the cells of screened microorganisms capable of decomposing or assimilating the poisonous substances contained in the waste waters to combine with the usual activated sludge in commensal state. The term "usual activated sludge" in the present specification means the activated sludge which has been used in the treatment of waste waters discharged from the common food industries, fermentation industries, paper manufacturing industries, leather industries, etc. or in that of sewage or human excrements and the term "commensal state" means the state where the cells of the microorganisms stick to the usual activated sludge and are not removed therefrom during subsequent treatment of poison-containing waste water therewith.

The biological processes available to the treatments of industrial waste waters and human excrements are classified into the anaerobic methane-fermentation process and the aerobic activated-sludge process. In general, the waste waters discharged from the food industries, fermentation industries, etc. or human excrements, contain carbohydrates, nitrogen-containing compounds and fats which are the BOD (Biological Oxygen Demand)-increasing substances, and there is no essential difference in the constituents of the above individual wastes as regards the biological treatments that remove the BOD-substances from said wastes. Consequently it has been possible in these fields, to acclimate and utilize a usual activated sludge hitherto used in the treatment of a waste water, to the treatments of other waste waters in a short period.

However, the waste waters discharged from the petroleum industry and other chemical industries contain special organic and inorganic poisonous substances peculiar to the individual chemical plants rather than the BOD-increasing substances, and therefore it has been difficult to acclimate and utilize a usual activated sludge or an activated sludge used at a chemical plant, to the treatments of other plant waste waters in a short period, and an extremely long period has been needed for the above acclimation, if at all possible.

On the other hand, research for microorganisms provided with such properties which will decompose or assimilate the poisonous substances contained in the chemical industry waste waters have been carried out, and as a result a waste-treating process has been proposed by which said poisonous substances in the waste waters are decomposed or assimilated by means of cultviating said microorganisms with such properties in these waste waters. However, that process had the shortcoming that the cells of the microorganisms and the waste waters cannot be separated readily after the treatment, and therefore the industrial application of that process has been possible only in case that the amount of the waste water is relatively small and moreover specifically enhanced values of the precipitates in that treatment process are by-produced. That is to say, the above so-called "pure" microorganism process cannot be applied to the treatment of waste water amounting to more than 1000 m.³/day and which is discharged from the petroleum industry- or the petrochemical industry-plants.

The object of the present invention is to prepare a specially activated sludge capable of being utilized in the biological treatment of waste waters containing poisonous substances, by combining cells of specific microorganisms with the usual activated sludge within an extremely short period.

According to the present invention, preparing the specially activated sludge which makes possible the biological treatment of waste waters containing poisonous substances is accomplished in a short period, by means of screening the microorganisms (bacteria, moulds, yeasts, actinomycetes) provided with properties of decomposing or assimilating said poisonous substances from natural origins and the known type cultures, culturing said screened microorganisms in liquid media, and blending the cultured liquid of the microorganisms with the usual activated sludge and continuously flowing the waste water containing said poisonous substances into the resulting microorganisms to combine with said usual activated slude in commensal state. When two or more poisonous substances are contained in a waste water, microorganisms having activities against each can be employed in the present process.

The waste waters to be treated in the present process are those containing poisonous substances capable of being decomposed or assimilated by specially selected microorganisms. For example, among the poisons to be decomposed or assimilated are the following: hydrogencyanide, nitrile compounds, phenols, aldehydes, petroleum oil, and other synthetic organic compounds. Microorganisms having the properties of decomposing or assimilating the poisonous substances can be obtained in accordance with the routine matter, that is, by screening microorganisms which multiply in the culture media containing said poisonous substances as the sole carbon or nitrogen source. For instance, the microorganisms belonging to the genus Alternaria, Aspergillus, Cephalosporium, Fusarium, Trichoderma, Pseudomonas, Corynebacterium, etc. are used as hydrogen-cyanide-decomposing organisms, and the microorganisms belong to the genus Pseudomonas, Corynebacterium, Brevibacterium, Bacillus, Mycobacterium, Flavobacterium, etc. are used as organisms decomposing the nitrile compounds such as acrylonitrile, acetonitrile, propionitrile, butyronitrile, succinonitrile, adiponitrile, lactonitrile and the like. To the treatment of waste waters containing the phenol-compounds, microorganisms belonging to the genus Corynebacterium, Achromobacter, Pseudomonas, etc. are employed, and to the treatment of waste waters containing the petroleum-oils, microorganisms belonging to the genus Corynebacterium, Pseudomonas, Nocardia, Candida, etc. are employed. Furthermore microorganisms belonging to the genus Pseudomonas can be employed to the treatment of waste water of sewage containing the synthetic cleanser "ABS" (sodium alkylbenzenesulfonate).

According to the invention, the microorganisms are cultured in liquid media, and the cultured liquid of the microorganisms are added to the usual activated sludge and homogeneous blending is carried out. This blended aqueous suspension is placed in a reaction vessel having an aeration equipment, and the waste water containing 100–200 p.p.m. of poisonous substance, e.g., hydrogen-cyanide, phenol or the like, is continuously made to flow into the above blended liquid, while overflowing out the liquid therefrom, under the condition that the amount of air required for the respiration function of said usual activated sludge and microorganisms is passed through the resulting mixed liquid. About 0.02% by weight of monobasic potassium phosphate and about 0.002% by weight of magnesium sulfate are added to the waste water as supplementary nutrients of the usual activated sludge and the microorganisms, and furthermore nitrogen-containing compounds such as ammonium sulfate, ammonium chloride, ammonium nitrate and the like are supplemented in case that the nitrogen source in the waste waters is insufficient. The temperature of the mixed liquid in the reaction vessel is maintained at 25–35° C., and its pH at 6.5–8.5. After continuing the above-mentioned acclimation for 6–14 days under such conditions, the sludge is separated and settles gradually from the liquid to obtain a clarified effluent, and it was observed that the settled sludge obtained in the above-mentioned treatment has acquired the properties capable of decomposing and removing cyanic acid, phenols and other poisonous substances contained in the waste waters.

The details of the invention will be illustrated by the following examples, however the description in these examples are not to be considered as limitations, since many changes in the details may be made without departing from the spirit of the invention. All percentages are by weight.

EXAMPLE 1

A medium consisting of 1.0% of glucose, 0.2% of peptone, 0.2% of potassium nitrate, 0.1% of monobasic potassium phosphate and 0.005% of magnesium sulfate (with its pH adjusted to 4.5) was inoculated with *Fusarium solani* and the organism was cultured at 30° C. for 24 hours while aerating and stirring. 1 kg. of the usual activated sludge obtained in the treatment of beer plant waste water was suspended in water in such a way that the precipitated volume atfer an hour's standing of the resulting suspension liquid amounted to 50%. 1 liter of the above cultured liquid of the *Fusarium solani* was added to 10 liters of the above usual activated sludge suspension and homogeneous blending was carried out. This blended liquid was placed in the reaction vessel having aeration equipment, and an artifical waste water containing potassium cyanide corresponding to 120 p.p.m. of hydrogen-cyanide, 0.025% of monobasic potassium phosphate and 0.0025% of magnesium sulfate (with its pH adjusted to 7.0) was continuously flowed into said blended liquid while overflowing out the liquid therefrom, under the condition of aerating, so as to acclimate and combine the microorganism cells with the usual activated sludge in commensal state, at 30° C. for 8 days. Thereby, the specially activated sludge amounting to 5.6 liters was obtained, which is the volume precipitated after an hour's standing of the acclimation liquid.

1 liter of this specially activated sludge was mixed with 1 liter of artificial waste water containing potassium cyanide corresponding to 400 p.p.m. of hydrogen-cyanide, 0.05% of monobasic potassium phosphate and 0.005% of magnesium sulfate (with its pH adjusted to 7.0), and then 500 ml./minute of air were passed through the resulting liquid mixture at 30° C. for 6 hours to bring about reaction, and thereby 200 p.p.m. (initial concentration) of hydrogen-cyanide in the liquid mixture were reduced to 5 p.p.m.

Contrary thereto, no decomposition and no removal of cyanic acid was effected in a similar treatment but using the usual activated sludge which was obtained in the treatment of a beer plant waste water. On the other hand, placing the usual activated sludge suspension prepared in the same way as the above-mentioned in the reaction vessel, and flowing continuously artificial waste water which contained 0.025% of monobasic potassium phosphate, 0.0025% of magnesium sulfate and potassium cyanide corresponding to 20–100 p.p.m. of hydrogen-cyanide (the concentration of this hydrogen-cyanide being gradually increased as time goes by) and whose pH was adjusted to 7.0, into said usual activated sludge suspension while overflowing out the liquid therefrom, under the condition of aerating at 30° C., the property of decomposing hydrogen-cyanide in the resulting liquid mixture appeared gradually from the 47th day and the hydrogen-cyanide-decomposing activity corresponding to that brought about in the process of our invention described as above, was achieved barely on the 63rd day after the beginning of this acclimation reaction. This result shows that an extremely long period is needed in the conventional process to acclimate and convert the usual activated sludge into the specially activated sludge capable of being utilized to the treatment of the chemical plant waste waters.

EXAMPLE 2

*Trichoderma viride* and *Cephalosporium mycophilum* were separately cultured in the mediums having the same composition as that of Example 1, at 30° C. for 24 hours. 1 kg. of the usual activated sludge obtained at a sewage disposal plant was suspended in water in such a way that the precipitated volume after an hour's standing of the resulting suspension liquid amounted to 50%. 1 liter of each cultured liquid of said *Trichoderma viride* and *Cephalosporium mycophilum* was added respectively to 10 liters of the above usual activated sludge suspension and homogeneous blending was carried out. The artificial waste water similar to that of Example 1 was continuously flowed into the above blended liquid while overflowing out the liquid therefrom, under the condition of aerating, so as to acclimate and combine with the cells of the microorganisms with the usual activated sludge in commensal state, at 30° C. for 10 days. Thereby, the specially activated sludge amounting to 5.2 liters was obtained, which is the volume precipitated after an hour's standing of the acclimation liquid.

1 liter of this specially activated sludge was mixed with 1 liter of the artificial waste water similar to that of Example 1, the resulting liquid mixture was aerated for 6 hours to bring about reaction, and thereby 200 p.p.m. of hydrogen-cyanide contained in the liquid mixture were reduced to 8 p.p.m. Contrary thereto, no decomposition and no removal of hydrogen-cyanide was effected in a similar treatment but using the usual activated sludge which was obtained at a sewage disposal plant.

EXAMPLE 3

A medium consisting of 2.0% of glucose, 0.2% of peptone, 0.2% of sodium nitrate, 0.1% of monobasic potassium phosphate, 0.05% of magnesium sulfate and 0.001% of ferrous sulfate (with its pH adjusted to 7.0) was inoculated with Corynebacterium nitrilophilus (ATCC No. 21419), which is a nitrile-decomposing bacterium, and the organism was cultured at 30° C. for 24 hours while aerating and stirring. The usual activated sludge suspension was prepared in the same way as in Example 1. 2 liters of the above cultured liquid of the *Corynebacterium nitrilophilus* were added to 10 liters of the usual activated sludge suspension and homogeneous blending was carried out. An artificial waste water containing 300 p.p.m. of acetonitrile, 0.02% of monobasic potassium phosphate and 0.0025% of magnesium sulfate (with its pH adjusted to 7.0) was continuously flowed into the above blended liquid while overflowing out the liquid therefrom, under the condition of aerating, so as to acclimate and combine the microorganism cells with the usual activated sludge in commensal state, at 30° C. for 8 days. Thereby, the specially activate sludge amounting to 4.8 liters was obtained, which is the volume precipitated after an hour's standing of the acclimation liquid.

1 liter of this specially activated sludge was mixed 1 liter of the acetonitrile-containing artificial waste water similar to the above-mentioned, the resulting liquid mixture was aerated for 6 hours to bring about reaction, and thereby 150 p.p.m. of acetonitrile were reduced to 4 p.p.m. Contrary thereto, no removal of acetonitrile was effected in a similar treatment but using the usual activated sludge which was obtained in the treatment of a beer plant waste water.

The morphological and physiological characteristics of the microorganism, *Corynebacterium nitrilophilus* ATCC No. 21419, used in this example are as follows:

Morphological characteristics:
Rods, 2.0 to 2.5 by 3.5 to 5.0 microns. Branching of cells and coccoid forms are found, high pleomorphic. No spore forming. Non-motile. Gram-positive. No acid fast.
Nutrient agar colonies:
Circular, rough surface, entire, umbonate, pink, opaque, butyrous, dull.
Nutrient agar slant:
Growth moderate, filiform, wrinkled surface, pink, raised, undulate, no-odor, butyrous, medium unchanged.
Nutrient broth:
Fragile pellicle, clear or slightly turbid, sediment.
Nutrient gelatin stab:
No-liquefaction, best growth at top.
Indol not produced.
Nitrite is produced from nitrate.
Hydrogen sulfide not produced.
Starch not hydrolyzed.
Litmus milk: unchanged
Methyl red test: negative
V.P.test: negative
Catalase: positive
Urease: positive
Cleavage of carbohydrate: Glucose (+) Maltose (+) Lactose (+) Sucrose (−)
Optimum pH for growth: pH 6.0 to 8.0
Optimum temperature for growth: 25° C. to 35° C., grows moderately at 20° C. and 37° C.
Relation to sodium chloride: grows moderately at 5%, no growth at 7%.
Aerobic.
Source: Isolated from activated sludge.
Kinds of compounds utilized for growth: n-pentadecane, n-hexadecane, ethylene glycol, propylene glycol, glycerol, ethanol, n-propanol, isopropanol, n-buthanol, acetate, acetone, methyl-ethyl-ketone, diethyl-ketone, acetonitrile, acetamide, n-propionitrile, n-buthylonitrile, iso-buthylonitrile, succinonitrile, adiponitrile.
Kinds of compounds scantly utilized or not utilized for growth: n-hexane, n-decane, n-tridecane, n-tetradecene-1, n-hexadecene-1, pentamethylnonane, iso-octane, iso-dodecane, benzene, toluene, xylene, styrene, methanol, formate, phenol, naphthalene, acetaldehyde, acrylonitrile, n-capronitrile, malononitrile, glutaronitrile, 1,5-dicyanopentane, crotononitrile, methacrylonitrile, benzonitrile, benzylcyanide, t-cinnamonitrile, salicylate.

EXAMPLE 4

A medium consisting of 2.0% of glucose, 0.02% of peptone, 0.2% of sodium nitrate, 0.1% of monobasic potassium phosphate, 0.05% of magnesium sulfate and 0.001% of ferrous sulfate (with its pH adjusted to 7.0) was inoculated with *Corynebacterium aromatycum* and the organism was cultured at 30° C. for 24 hours while aerating and stirring. The usual activated sludge suspension was prepared in the same way as in Example 1. 2 liters of the above cultured liquid of the *Corynebacterium aromatycum* were added to 10 liters of said usual activated sludge suspension and homogeneous blending was carried out. An artificial waste water containing 200 p.p.m. of phenol, 0.02% of monobasic potassium phosphate, 0.0025% of magnesium sulfate and 0.005% of ammonium sulfate (with its pH adjusted to 7.0) was continuously flowed into the above blended liquid while overflowing out the liquid therefrom, under the condition of aerating, so as to acclimate and combine the microorganism cells with the usual activated sludge in commensal state, at 30° C. for 10 days. Thereby, the specially activated sludge amounting to 5.2 liters was obtained, which is the volume precipitated after an hour's standing of the acclimation liquid.

1 liter of this specially activated sludge was mixed with 1 liter of the phenol-containing artificial waste water similar to the above-mentioned, the resulting liquid mixture was aerated at 30° C. for 6 hours to bring about reaction, and thereby 100 p.p.m. of phenol were reduced to 5.3 p.p.m. Contrary thereto, no removal of phenol was effected in a similar treatment but using the usual activated sludge which was obtained in the treatment of a beer plant waste water.

EXAMPLE 5

The medium having the same composition as that of Example 4 was inoculated with *Corynebacterium petrophilum* ASB–5400 (ATCC No. 19080) and the organism was cultured at 30° C. for 48 hours while aerating and stirring. The usual activated sludge suspension was prepared in the same way as in Example 2. 2 liters of the above cultured liquid of the *Corynebacterium petrophilum* were added to 10 liters of said usual activated sludge suspension and homogeneous blending was carried out. An artificial waste water containing kerosene corresponding to 150 p.p.m. of the COD (Chemical Oxygen Demand) substances, 0.02% of monobasic potassium phosphate and 0.02% of ammonium sulfate (with its pH adjusted to 7.2) was continuously flowed into the above blended liquid while overflowing out the liquid therefrom, under the condition of aerating, so as to acclimate and combine the microorganism cells with the usual activated sludge in commensal state, at 30° C. for 8 days. Thereby, the specially activated sludge amounting to 4.9 liters was obtained, which is the volume precipitated after an hour's standing of the acclimation liquid.

1 liter of this specially activated sludge was mixed with 1 liter of the oil-containing artificial waste water similar to the above-mentioned, the resulting liquid mixture was aerated at 30° C. for 6 hours to bring about reaction, and thereby 80 p.p.m. of the COD-substances were reduced to 34 p.p.m. Contrary thereto, the concentration of the COD-substances remained at 68 p.p.m. in a similar treatment but using the usual activated sludge which was obtained at a sewage disposal plant.

EXAMPLE 6

The medium having the same composition as that of Example 4 was inoculated with *Corynebacterium petrophilum* ASB–5400 (ATCC No. 19080) and the organism was cultured at 30° C. for 48 hours while aerating and stirring. A medium consisting of 2.0% of glucose, 0.1% of monobasic potassium phosphate, 0.2% of peptone, 0.2% of sodium nitrate and 0.05% of megnesium sulfate (with its pH adjusted to 5.0) was inoculated with *Candida tropi-*

*calis*, and the organism was cultured at 30° C. for 48 hours while aerating and stirring. 1 kg. of the usual activated sludge which was obtained at an excretion disposal plant was suspended in water in such a way that the precipitated volume after an hour's standing of the resulting suspension liquid amounted to 50%. 2 liters of each cultured liquid of said *Corynebacterium petrophilum* and *Candida tropicalis* were respectively added to 10 liters of the above usual activated sludge suspension and homogeneous blending was carried out. The oil-containing artificial waste water similar to that of Example 5 was continuously flowed into this blended liquid while overflowing out the liquid therefrom, under the condition of aerating, so as to acclimate and combine cells of both the microorganisms with the usual activated sludge in commensal state, at 30° C. for 8 days. Thereby, a specially activated sludge amounting to 5.6 liters was obtained, which is the volume precipitated after an hour's standing of the acclimation liquid.

1 liter of this specially activated sludge was mixed with 1 liter of the artificial waste water similar to that of Example 5, the resulting liquid mixture was aerated at 30° C. for 6 hours, and thereby 80 p.p.m. of the COD-substances were reduced to 28 p.p.m. Contrary thereto, the concentration of the COD-substances remained at 72 p.p.m. in a similar treatment but using the usual activated sludge which was obtained at an excretion disposal plant.

EXAMPLE 7

The medium having the same composition as that of Example 4 was inoculated with *Pseudomonas phenolyticum* and the organism was cultured at 30° C. for 48 hours while aerating and stirring. The usual activated sludge suspension was prepared in the same way as in Example 1. 1 liter of the above cultured liquid of the *Pseudomonas phenolyticum* was added to 10 liters of said activated sludge suspension and homogeneous blending was carried out. An artificial waste containing 100 p.p.m. of synthetic cleanser "ABS" (sodium 5 - phenyl-dodecansulfonate), 0.025/ of monobasic potassium phosphate, 0.025% of ammonium sulfate and 0.0025% of magnesium sulfate (with its pH adjusted to 7.2) was continuously flowed into the above blended liquid while overflowing out the liquid therefrom, under the condition of aerating, so as to acclimate and combine the microorganism cells with the usual activated sludge in commensal state, at 30° C. for 7 days. Thereby, the specially activated sludge amounting to 5.2 liters was obtained, which is the volume precipitated after an hour's standing of the acclimation liquid were obtained.

1 liter of this activated sludge was mixed with 1 liter of the ABS-containing artificial waste water similar to the above-mentioned, the resulting liquid mixture was aerated at 30° C. for 6 hours, and thereby 52 p.p.m. of the ABS were reduced to 24 p.p.m. Contrary thereto, the concentration of the ABS remained at 44 p.p.m. in a similar treatment but using the usual activated sludge which was obtained in the treatment of a beer plant waste water.

What is claimed is:

1. A process for preparing specially activated sludge for the biological treatment of waste waters containing poisonous substances selected from the group consisting of hydrogen-cyanide, nitrile-compounds, aldehyde-compounds, phenol, phenol-compounds, petroleum-oils and the synthetic cleanser alkyl-benzenesulfonate, which comprises
    (a) selecting microorganisms which are capable of decomposing said poisonous substances contained in chemical industry waste waters or in sewage waste waters, said microorganisms being selected from the group consisting of genus Alternaria, Aspergillus, Cephalosporium, Fusarium, Trichoderma, Pseudomonas, Corynebacterium, Brevibacterium, Bacillus, Mycobacterium, Flavobacterium, Achromobacter, Nocardia and Candida;
    (b) culturing said microorganisms in liquid media;
    (c) homogeneously blending said liquid of cultured microorganisms obtained in step (b) with an aqueous suspension of the usual activated sludge;
    (d) flowing continuously an aqueous solution containing at least one of said poisonous substances into the resulting blended liquid while overflowing out the liquid therefrom, under aerobic conditions at a temperature of about 25–35° C. and for a period of not more than about 6–14 days, to force said microorganism cells to combine with said usual activated sludge in commensal state; and
    (e) thereafter continuously treating further amounts of aqueous solution containing said poisonous substances with said microorganism cells combined with said usual activated sludge in commensal state produced in step (d).

2. The process of claim 1 wherein the poisonous substance is hydrogen-cyanide and the microorganism belongs to the genus Alternaria, Aspergillus, Cephalosporium, Fusarium, Trichoderma, Pseudomonas or Corynebacterium.

3. The process of claim 1, wherein the poisonous substance is a nitrile compound and the microorganism belongs to the genus Pseudomonas, Corynebacterium, Brevibacterium, Bacillus, Mycobacterium or Flavobacterium.

4. The process of claim 1, wherein the poisonous substance is a phenol-compound and the microorganism belongs to the genus Corynebacterium, Achromobacter or Pseudomonas.

5. The process of claim 1, wherein the poisonous substance is a petroleum-oil and the microorganism belongs to the genus Corynebacterium, Nocardia or Candida.

6. The process of claim 1, wherein the poisonous substance is the synthetic cleanser "Alkyl-benzenesulfonate" and the microorganism belongs to the genus Pseudomonas.

7. The process of claim 3, wherein the nitrile-compound is at least one member selected from the group consisting of acrylonitrile, acetonitrile, propionitrile, lactonitrile, butyronitrile, succinonitrile and adiponitrile.

8. The process of claim 1, wherein supplementary nutrients of the usual activated sludge and the microorganisms are added to said aqueous solution containing the poisonous substances, said supplementary nutrients being at least one member selected from the group consisting of inorganic salts, organic nitrogen compounds and inorganic nitrogen compounds.

References Cited

UNITED STATES PATENTS 3,356,609    12/1967    Bruemmer _____ 210—11 X

FOREIGN PATENTS 620,366    5/1961    Canada.
211,928    5/1956    Australia.

OTHER REFERENCES

Rogoyskaya et al.: Abstract Appearing In Journal WPCF, May 1961, vol. 33, pp. 457 and 475 (P.O.S.L.).

Ludzack, F. J., et al.: Experimental Treatment of Organic Cyanides, etc., Jour. WPCF, May 1961, vol. 33, pp. 492–505 (P.O.S.L.).

Ludzack, F. J., et al.: Experimental Treatment of Or-Commercially Important Organic Cyanides, Proc. 13th Ind. Waste Conf., Purdue Univ. (1958), pp. 297–311.

Nesbitt, J. B., et al.: The Aerobic Metabolism of Potassium Cyanide, Proc. 14th Ind. Waste Conf., Purdue Univ. (1959), pp. 518, 519, 521–528 and 530–534 relied on.

MICHAEL ROGERS, Primary Examiner